US009663387B2

(12) United States Patent
Siedle et al.

(10) Patent No.: US 9,663,387 B2
(45) Date of Patent: May 30, 2017

(54) FILTRATION MEDIUM COMPRISING A METAL SULFIDE

(71) Applicant: 3M INNOVATIVE PROPERTIES COMPANY, St. Paul, MN (US)

(72) Inventors: Allen R. Siedle, Bloomington, IN (US); Meredith McMurdo Doyle, St. Paul, MN (US); Mark R. Stouffer, Middletown, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 86 days.

(21) Appl. No.: 14/366,163

(22) PCT Filed: Dec. 18, 2012

(86) PCT No.: PCT/US2012/070300
§ 371 (c)(1),
(2) Date: Jun. 17, 2014

(87) PCT Pub. No.: WO2013/096284
PCT Pub. Date: Jun. 27, 2013

(65) Prior Publication Data
US 2014/0360942 A1    Dec. 11, 2014

Related U.S. Application Data

(60) Provisional application No. 61/578,972, filed on Dec. 22, 2011.

(51) Int. Cl.
| | | |
|---|---|---|
| *C02F 1/28* | (2006.01) | |
| *C02F 101/12* | (2006.01) | |
| *C02F 101/16* | (2006.01) | |

(52) U.S. Cl.
CPC .............. *C02F 1/288* (2013.01); *C02F 1/281* (2013.01); *C02F 1/283* (2013.01); *C02F 2101/12* (2013.01); *C02F 2101/16* (2013.01); *C02F 2303/185* (2013.01); *C02F 2305/00* (2013.01)

(58) Field of Classification Search
CPC ........... C02F 1/288; C02F 1/283; C02F 1/281
See application file for complete search history.

(56) References Cited

U.S. PATENT DOCUMENTS

| | | | |
|---|---|---|---|
| 4,094,777 A | 6/1978 | Sugier | |
| 4,199,522 A * | 4/1980 | Murchison | C07C 1/043 502/211 |
| 4,329,224 A * | 5/1982 | Kim | |
| 4,629,571 A | 12/1986 | Salem | |
| 4,666,610 A | 5/1987 | Kuhns | |
| 5,232,582 A | 8/1993 | Takahashi | |
| 5,245,106 A | 9/1993 | Cameron | |
| 5,338,458 A | 8/1994 | Carrubba | |
| 5,804,151 A | 9/1998 | Sweetser | |
| 6,241,871 B1 * | 6/2001 | Donini | C25B 1/00 205/617 |
| 6,419,837 B1 | 7/2002 | Akse | |
| 6,451,209 B1 | 9/2002 | Kaas | |
| 6,699,393 B2 | 3/2004 | Baker | |
| 6,852,217 B2 * | 2/2005 | Jokschas | B01D 27/06 210/416.4 |
| 7,097,773 B1 | 8/2006 | Furlough | |
| 7,727,931 B2 | 6/2010 | Brey | |
| 2002/0104794 A1 * | 8/2002 | Hoffmann | B01D 35/30 210/323.2 |
| 2005/0127323 A1 | 6/2005 | Tyler | |
| 2008/0047902 A1 | 2/2008 | Beswick | |
| 2008/0053922 A1 * | 3/2008 | Honsinger, Jr. | B01D 15/00 210/777 |
| 2009/0039028 A1 | 2/2009 | Eaton | |
| 2011/0000855 A1 | 1/2011 | Kuhel | |
| 2011/0278224 A1 * | 11/2011 | Liao | |

FOREIGN PATENT DOCUMENTS

| | | |
|---|---|---|
| JP | 2003-266082 | 9/2003 |
| JP | 2005-288358 | 10/2005 |
| WO | WO 93/04984 | 3/1993 |
| WO | WO 2006-023002 | 3/2006 |
| WO | WO 2008/027530 | 6/2008 |
| WO | WO 2011-125504 | 10/2011 |
| WO | WO 2013-039675 | 3/2013 |
| WO | WO 2013-096074 | 6/2013 |
| WO | WO 2013-096079 | 6/2013 |
| WO | WO 2013-096281 | 6/2013 |
| WO | WO 2013-096284 | 6/2013 |
| WO | WO 2014-042722 | 3/2014 |

OTHER PUBLICATIONS

Tezuka et al., Synthesis of covellite (CuS) from the elements, Solid State Sciences 9 (2007) 95-99 at "Introduction" p. 95.*
"Sodium Sulphide" web page, published 2012, downloaded Dec. 22, 2015.*
"A periodic table of elements," Los, Alamos National Laboratory,[retrieved from the internet on Sep. 5, 2014], URL http://periodic.lanl.gov/index.shtml, 1 page.
Barr, "Control of the Chlorate factor in Electrooxidation Leaching of Molybdenum Concentrates," International Journal of Mineral Processing, 1975, vol. 2, pp. 303-320.
Cheetham, "Investigation of the Mixed-Metal Sulfide (Mn,Fe)S2 by Analytical Electron Microscopy and Mossbauer Spectroscopy," Inorganic Chemistry, 1981, vol. 20, No. 9, 2747-2750.
International Search Report for PCT International Application No. PCT/US2012/070300, mailed on Apr. 29, 2013, 3 pages.
Kiyoura, "Mechanism, Kinetics, and Equilibrium of Thermal Decomposition of Ammonium Sulfate," Industrial & Engineering Chemistry Process Design and Development, 1970, vol. 9, N. 4, pp. 489-641.
Kuhn, "A Review of the Air Oxidation of Aqueous Sulphide Solutions," Journal of Chemical Technology and Biotechnology, 1983, vol. 33A, pp. 406-414.

(Continued)

*Primary Examiner* — Chester Barry
(74) *Attorney, Agent, or Firm* — Julie Lapos-Kuchar

(57) ABSTRACT

Described herein is a liquid filtration device is disclosed a vessel for treating an aqueous liquid, wherein the vessel contains a filtration medium and wherein the filtration medium comprises a metal sulfide, wherein the sulfur in the form of a metal sulfide is at least 0.5% by weight of the filtration media.

9 Claims, No Drawings

(56) References Cited

OTHER PUBLICATIONS

Kumar, "Atom-Transfer Redox Kinetics: General-Acid-Assisted Oxidation of Iodide by Chloramines and Hypochlorite," Inorganic Chemistry, 1986, vol. 25, pp. 4344-4350.
Margerum, Environmental Science &Technology,1994, vol. 28, pp. 331.
Ross, "Surface Oxidation of Molybdenum Disulfide," Journal of Physical Chemistry, 1955, vol. 59, No. 9, pp. 889-892.
Vikesland, "Iron Oxide Surface-Catalyzed Oxidation of Ferrous Iron by Monochloramine: Implications of Oxide Type and Carbonate on Reactivity," Environmental Science & Technology, 2002, vol. 36, pp. 512-519.
Vikesland, "Modeling the Kinetics of Ferrous Iron Oxidation by Monochloramine," Environmental Science & Technology, 2002, vol. 36, pp. 662-668.
Wang, "Thermogravimetric-differential thermal analysis of the solid-state decomposition of ammonium tetrathiomolybdate during heating in argon", Journal of Materials Science 1998, vol. 33, pp. 3079-3083.

* cited by examiner

FILTRATION MEDIUM COMPRISING A METAL SULFIDE

CROSS REFERENCE TO RELATED APPLICATIONS

This application is a national stage filing under 35 U.S.C. 371 of PCT/US2012/070300, filed Dec. 18, 2012, which claims priority to U.S. Provisional Patent Application No. 61/578,972 filed Dec. 22, 2011, the disclosures of which are incorporated by reference in their entirety herein.

TECHNICAL FIELD

A filtration medium comprising a metal sulfide is described. Such materials may be used to remove chloramines from aqueous solutions.

BACKGROUND

Chloramine is commonly used in low concentration as a secondary disinfectant in municipal water distribution systems as an alternative to chlorination with free chlorine. Concerns over taste and odor of chloramine treated water have led to an increase in the demand for water filters with chloramine removal capabilities.

Carbon particles, such as activated carbon particles, have been used to remove chloramine from aqueous streams. Improvements in removal of chloramine can be achieved by reducing the mean particle diameter of the carbon and by increasing the carbon bed contact time. Although parameters such as contact time and mean particle diameter are known to affect chloramine removal efficiencies, more significant improvements are desired without significantly increasing the pressure drop of filtration media.

U.S. Pat. No. 5,338,458 (Carrubba et al.) discloses an improved process for the removal of chloramine from gas or liquid media by contacting the media with a catalytically-active carbonaceous char.

U.S. Pat. No. 6,699,393 (Baker et al.) shows improved chloramine removal from fluid streams, when the fluid stream is contacted with an activated carbon, which has been pyrolyzed in the presence of nitrogen-containing molecules, versus a catalytically-active carbonaceous char.

SUMMARY

There is a desire to provide a filtration medium, which is less expensive and/or more efficient at the removal of chloramine than currently available filtration media. In some instances, there is also a desire to provide a solid block of carbon to remove chloramine. In other instances, there is a desire to have a granular material that may be used in a packed bed. In still other instances, there is a desire to provide a material that may be used in a web-form.

In one aspect, a liquid filtration device is disclosed comprising a vessel for treating an aqueous liquid, wherein the vessel contains a filtration medium and wherein the filtration medium comprises a metal sulfide, wherein the sulfur in the form of a metal sulfide is at least 0.5% by weight of the filtration media.

In another aspect, a liquid filtration device is described comprising a fluid conduit for liquids, fluidly connecting a fluid inlet to a fluid outlet; and a filtration medium disposed in the fluid conduit; wherein the filtration medium comprises a metal sulfide, wherein the sulfur in the form of a metal sulfide is at least 0.5% by weight of the filtration medium.

In yet another aspect, a liquid filtration device is described comprising: a vessel for treating aqueous solutions wherein the vessel contains a supported metal sulfide, wherein the supported metal sulfide is selected from a reaction product of: (a) co-precipitation of a metal sulfide onto a support; (b) reacting a supported metal oxide with sulfur source; (c) reacting a supported metal salt with sulfur source; (d) heating a support with a metal carbonyl in the presence of sulfur source; (e) reacting a support comprising a metal with sulfur source; and (g) thermal decomposition of a supported thiometallate or oxythiometallate.

In yet another embodiment, a method for removing chloramine from aqueous solutions is described comprising: providing an aqueous solution comprising chloramine and contacting the aqueous solution with a composition comprising at least 0.5% by weight of a metal sulfide.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term
"a", "an", and "the" are used interchangeably and mean one or more; and
"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present disclosure is directed to a filtration medium comprising a metal sulfide. Filtration media comprising the metal sulfides may be used for the removal of chloramine from aqueous solutions.

Metal sulfides comprise a metal chemically combined with sulfur. These metal sulfides can include other elements such as oxygen or carbon.

Metal, as used herein, refers to chemical elements that are located in columns 3-12 and rows 4-6 in the periodic table of the elements; and also elements 57-71, known as the lanthanides. Exemplary metals of the metal sulfide include: copper, iron, manganese, silver, zirconium, niobium, molybdenum, tungsten, and combinations thereof.

Exemplary metal sulfides include: copper sulfide, iron sulfide, manganese sulfide, zirconium sulfide, zinc sulfide, niobium sulfide, molybdenum sulfide, and tungsten sulfide and oxysulfides of these metals, such as molybdenum oxysulfide.

In one embodiment of the present disclosure, the metal sulfides are used by themselves in a filtration medium.

Support

In another embodiment, the metal sulfides are disposed on the surface of a support. Supports include a carbon substrate and/or an inorganic oxide substrate, which may be a granular material, a powder material, a fiber, a tube, or a foam.

In one embodiment, it is preferable for the support upon which the metal sulfide is disposed to be porous. The porous nature will enable, for example, more surface area for chloramine removal. Preferably the support has a high surface area (e.g., at least 100, 500, 600 or even 700 $m^2/g$;

and at most 1000, 1200, 1400, 1500, or even 1800 m$^2$/g based on BET (Brunauer Emmet Teller method) nitrogen adsorption). Surface areas may be accomplished by using a highly porous carbon substrate or inorganic oxide substrate and/or by applying a physical technique (such as crushing or pulverizing) to decrease the particle size of the resulting product.

The morphology of the carbon substrate is not particularly limited and may include a non-particulate, a particulate, or an aggregate. Additional exemplary morphologies include: a carbon block, a carbon monolith, foams, films, fibers, nanoparticulates, such as nanotubes and nanospheres. A non-particulate is a substrate that is not composed of discernable, distinct particles. A particulate substrate is a substrate that has discernable particles, wherein the particle may be spherical or irregular in shape and has an average diameter of at least 0.1, 1, 5, 10, 20, or even 40 micrometers (μm) to at most 75 μm, 100 μm, 500 μm, 1 millimeter (mm), 2 mm, 4 mm, 6.5 mm, or even 7 mm. An aggregate (or a composite) is formed by the joining or conglomeration of smaller particles with one another or with larger carrier particles or surfaces. The aggregates may be free standing (self-supporting against gravity).

Typically, the morphology the carbon substrate will be selected based on the application. For example, particulate with a large particle size is desirable when the compositions of the present disclosure are used in applications requiring low pressure drops such as in beds through which gases or liquids are passed. In another example, particle sizes of 20 to 200 μm, may be preferable when used in a carbon block monolith.

The size of the pores of the carbon substrate can be selected based on the application. The carbon substrate may be microporous carbon, macroporous carbon, mesoporous carbon, or a mixture thereof.

In one embodiment, the carbon substrate is comprised of activated carbon, in other words carbon that has been processed to make it highly porous (i.e., having a large number of pores per unit volume), which thus, imparts a high surface area.

Commercially available carbon substrates include: granular activated carbon available under the trade designation "RGC" by Mead Westvaco Corp, Richmond, Va. may be preferred in water treatment. Activated coconut carbon available under the trade designation "KURARAY PGW" by Kuraray Chemical Co., LTD, Okayama, Japan may also be used.

In addition to carbon substrates, the choice of support materials is quite broad and can include without limitation alumina, silica, zeolites, ion exchange resins, porous organic materials, metal oxides and metal oxide framework (MOF) materials, and inorganic oxides. All of these materials can be used in combination with one another or in combination with the carbon substrate.

Exemplary inorganic oxide substrates include: silicon dioxide (silica), zirconia, titania, ceria, alumina, iron oxide, zinc oxide, tin oxide, alumina/silica, zirconia-silica, clays, talc-containing materials, spinel-structured oxides such as magnesium aluminate or cobalt iron oxide or the like, and other binary or ternary oxides of aluminum or silicon with other metal oxide materials. Although the inorganic oxide may be essentially pure, it may contain small amounts of stabilizing ion such as ammonium and alkaline metal ions, or it may be a combination of oxides such as a combination of titania and zirconia.

The size of the pores of the inorganic oxide substrate can be selected based on the application. The inorganic oxide substrate may be microporous, macroporous, mesoporous, or a mixture thereof. Particularly useful are inorganic oxide substrates that have high surface areas.

Preparation of Supported Metal Sulfides

Several methods may be used to prepare the supported metal sulfides. Examples include: (1) co-precipitation of a metal sulfide onto a support; (2) reacting a supported metal oxide with a sulfur source; (3) reacting a supported metal salt with sulfur source; (4) heating a support with a metal carbonyl in the presence of sulfur source; (5) reacting a support comprising a metal with a sulfur source; (6) reacting a sulfided carbon with a metal salt; and (7) thermal decomposition of a supported thiometallate or oxythiometallate.

In the methods above, sources of sulfur other than elemental sulfur, such as hydrogen sulfide, sulfided carbon, or any sulfur source known in the art, such as sulfur analogs of epoxides, and combinations thereof may be used. Elemental sulfur may be preferable because it may be used in the absence of solvent and without need for high pressures of gas.

As a general matter, to ensure complete conversion of the metal-containing precursor to the desired metal sulfide, an excess of sulfur or a sulfur source may be used. This may result in excess sulfur in the product, but it is believed to not interfere with operation of the metal sulfide phase(s). Reactions between sulfur and metal precursors are usually conducted in a temperature range of 200-500° C. Optionally, to prevent unwanted oxidation of the sulfur during the reaction, sources of oxygen, such as air or water, may be excluded or replaced by an inert gas such as dry nitrogen. The supported metal sulfides of this disclosure may be used in combination with other materials such as carbon treated so as to incorporate oxygen or nitrogen so as to provide different chemical functionality and utility; or microporous carbons that can adsorb volatile organic materials.

Co-precipitation syntheses may be conducted by adding an aqueous solution of a metal salt to a stirred suspension of a support (e.g., carbon particles) in aqueous sodium sulfide. The metal sulfide precipitates and forms a continuous or discontinuous coating or layer on the support. Salts that dissolve readily in water are useful in this methodology and include without limitation, chlorides, bromides, iodides, acetates, nitrates, and sulfates. In addition to sodium sulfide, other water soluble metal sulfides, such as hydrogen sulfide and materials that release sulfide or hydrosulfide ions on exposure to water, such as thiourea and thioacetamide, may be used.

In another embodiment, a supported metal sulfide may be prepared by treating a supported metal oxide with a sulfur source. Because pure transition metal oxides are generally insoluble in water, it is advantageous to use a soluble oxide precursor that can transform to an oxide upon heating. For this purpose, molecular precursors to the metal oxides such as vanadyl sulfate, $VOSO_4$, $NH_4[Nb(C_2O_4)_2O]$, or oxometallates such as $NaWO_4$ can be used. Alternatively, polynuclear oxoanion salts such as $(NH_4)_6Mo_7O_{24}$, $(NH_4)_6H_2W_{12}O_{40}$ and $(NH_4)_6V_{10}O_{28}$ may be employed. Such compounds may be dissolved in water and impregnated onto a support, such as a carbon substrate. After drying, the impregnated support is treated with a sulfur source. An alternative strategy is to form the oxide directly on the support. This can be done when the oxide forms as an insoluble reaction product. As a specific example, insoluble $MnO_2$ is formed by the reduction of $KMnO_4$ by carbon particles in water at neutral pH. During this chemical reaction, $MnO_2$ separates as a coating on the particles.

Supported metal sulfides may also be obtained by first impregnating the support with a solution of a metal salt and then treating the dried, impregnated material with a sulfur source. Examples of metal salts that may be employed in this manner include: carboxylates, nitrates, halides, sulfates, hydroxides, and carbonates. In one embodiment, the metal salt is a nitrate salt of divalent Co, Mn and Cu; $Fe(NO_3)_3$; $CuSO_4$; and $Cr_2(SO_4)_3$.

Metal carbonyls (e.g., binary compounds containing a metal and carbon monoxide), are useful for obtaining supported metal sulfides. The vapor pressures of metal carbonyls are sufficiently high that they do not need to be intimately mixed with the support and sulfur source before heating in a closed reaction vessel since the vapor permeates the reactor. The reaction may release substantial amounts of carbon monoxide and venting may be necessary. For example, metal carbonyls include $Mn_2(CO)_{10}$ and $M(CO)_6$ where M=Cr, Mo, and W. Because metal carbonyls react with oxygen at elevated temperatures, their reactions are preferably conducted in the absence of air.

Supported metal sulfides may be prepared from sulfided carbons, members of the COxEy class of materials (E=S). These carbons have the ability to interact with or bind metal ions. Once bound, the metal ions may be reduced to provide the metal in combination with sulfur. See U.S. Prov. Appl. No. 61/533,297 (Allen at el.) filed Sep. 12, 2011, and U.S. Prov. Appl. Nos. 61/578,957, 61/578,967, and 61/578,971 filed contemporaneously with the present application and all of which are herein incorporated by reference.

In another embodiment, thermal decomposition of thiometallates and oxythiometallates is a convenient way to make materials useful for removal of chloramine. The salts (e.g., $(NH_4)_2MS_4$, $(NH_4)_2MO_2S_2$, and $(NH_4)_2MOS_3$, where M is Mo or W) are water soluble and, therefore, can be used to impregnate a support (e.g., an activated carbon substrate).

The impregnated support can then be heated in an inert or air environment to thermally decompose the thiometallate or oxythiometallate. While not wishing to be bound by theory, it is believed that once dried, these salts, supported on a substrate, decompose at low temperatures to form supported sulfides or oxysulfides. Exemplary temperatures can be as low as 75°, 100°, 125°, or even 140° C. In one embodiment, when the thiometallate or oxythiometallate is impregnated into a support, such as carbon, this material can exhibit a lower thermal decomposition temperature than the same material in the absence of a support.

In one embodiment, the thiometallate is at least one of: a salt of $MS_4^{-2}$, $MO_2S_2^{2-}$, and $MOS_3^{2-}$, wherein the metal, M, is molybdenum or tungsten.

In one embodiment, this process produces a material that may be active for chloramine removal while not leaching metal into the treated aqueous effluent.

In one embodiment, the supported metal sulfide is disposed in a matrix. The matrix may be a web, a polymer-containing composite block, on the surface of a tube, or in another structure that enables aqueous solutions to pass therethrough. Such matrices include carbon blocks, and webs such as blown fiber webs.

Use

In one embodiment of the present disclosure, the metal sulfide is used in a filter medium. Because of the ability of the compositions of the present disclosure to remove chloramine, the compositions of the present disclosure may be used as a filtration media. Filtration methods as known in the art can be used.

Although the metal sulfide may be used in an uncontained (bulk-fashion), it is preferable that the metal sulfide be contained in some sort of support matrix and/or vessel for ease of use.

The metal sulfide (which may or may not be supported on a substrate) may be used in a powdered form, a granular form, or shaped into a desired form. For example, the metal sulfide may be a compressed blend of a carbon substrate, the metal sulfide and a binder material, such as a polyethylene, e.g., an ultra high molecular weight polyethylene, or a high-density polyethylene (HDPE). In another embodiment, the metal sulfide may be loaded into web, such as a blown microfiber, which may or may not be compacted such as described in U.S. Publ. No. 2009/0039028 (Eaton et al.), herein incorporated in its entirety.

The loading of metal sulfide, expressed as weight of metal sulfide divided by the total weight of the filtration media, can vary widely, depending on if the metal sulfide is used neat or if it is disposed on a support. In one embodiment, the sulfur in the form of a metal sulfide is at least 0.5, 1, 5, 10, 15, or even 20% by weight when the metal sulfide is used in conjunction with a support. In another embodiment, the sulfur in the form of a metal sulfide is at least 20, 30, 40, 50, 60, 70, 80, or even 90% by weight.

Because the metal sulfide may comprise a ferromagnetic material, in one embodiment, the metal sulfide may be part of a carbon support such as carbon particles, which can be heated by induction heating to form composite blocks. Typically in making a carbon block monolith, carbon particles are heated in an oven to fuse the carbon particles together. When using ferromagnetic material, a high frequency magnetic field may be used to heat the metal sulfide, causing the carbon support to become fused and form a carbon block monolith. In one embodiment, the magnetic field may oscillate at a frequency in a range from about $10^3$ Hz to about $10^{15}$ Hz.

The use of induction heating to prepare a composite block, may allow more uniform heating and better heat penetration to the core of the composite carbon block and/or increase manufacturing throughput of the carbon block composites. The levels of iron salts versus other metal salts may be varied to optimized the ferromagnetic properties and the chloramine removal properties of the material.

In one embodiment, the metal sulfide is disposed in a fluid conduit, wherein the fluid conduit is fluidly connected to a fluid inlet and a fluid outlet. Such systems may include packed beds.

In one embodiment, the metal sulfide may be used to remove chloramines from a fluid stream, particularly a liquid fluid stream, more specifically, an aqueous fluid stream. Chloramines are formed from the aqueous reaction between ammonia and chlorine (hypochlorite). Thus, adding ammonia ($NH_3$) to a chlorination system converts chlorine to chloramines Specifically, monochloramine, hereafter referred to as "chloramine," in low concentrations arise from the disinfection of potable water sources. In one embodiment, after contacting the aqueous solution with a composition comprising a metal sulfide, as disclosed herein, the resulting aqueous solution comprises a reduced amount of chloramines, for example, at least a 10, 20, 25, 30, or even 50% chloramine reduction as measured by the Chloramine Removal Test, at 180 seconds described in the Example Section below.

In one embodiment, the material for removal of chloramine comprises carbon, molybdenum, and sulfur, wherein the molybdenum content is at least 0.2, 0.5, 1, 2, 5, 10, 25, or even 50 wt % based on the total weight of the carbon, sulfur and molybdenum; and wherein the sulfur content is at least 0.2, 0.5, 1, 2, 5, 10, 25, or even 50 wt % based on the total weight of the carbon, sulfur and molybdenum present.

A non-limiting list of exemplary embodiments and combinations of exemplary embodiments of the present disclosure are disclosed below.

Embodiment 1

A liquid filtration device comprising: a vessel for treating an aqueous liquid, wherein the vessel contains a filtration medium and wherein the filtration medium comprises a metal sulfide, wherein the sulfur in the form of a metal sulfide is at least 0.5% by weight of the filtration media.

Embodiment 2

A liquid filtration device comprising a fluid conduit for liquids, fluidly connecting a fluid inlet to a fluid outlet; and a filtration medium disposed in the fluid conduit; wherein the wherein the filtration medium comprises a metal sulfide, wherein the sulfur in the form of a metal sulfide is at least 0.5% by weight of the filtration medium.

Embodiment 3

The liquid filtration device of embodiment 1 or 2, wherein the filtration medium further comprises a support, wherein the surface of the support comprises the metal sulfide.

Embodiment 4

The liquid filtration device of embodiment 3, wherein support is a carbon-containing particle.

Embodiment 5

The liquid filtration device of any one of the previous embodiments, wherein the metal of the metal sulfide is selected from copper, iron, manganese, silver, zirconium, niobium, molybdenum, tungsten, and combinations thereof.

Embodiment 6

The liquid filtration device of any one of the previous embodiments, wherein the filtration medium further comprises a matrix and the metal sulfide is disposed in the matrix.

Embodiment 7

The liquid filtration device of embodiment 6, wherein the matrix is a web, or a polymer containing composite block.

Embodiment 8

A liquid filtration device comprising: a vessel for treating aqueous solutions wherein the vessel contains a supported metal sulfide, wherein the supported metal sulfide is selected from a reaction product of: (a) co-precipitation of a metal sulfide onto a support; (b) reacting a supported metal oxide with a sulfur source; (c) reacting a supported metal salt with a sulfur source; (d) heating a support with a metal carbonyl in the presence of a sulfur source; (e) reacting a support comprising a metal with a sulfur source; and (g) thermal decomposition of a supported thiometallate or oxythiometallate.

Embodiment 9

The liquid filtration device of embodiment 8, wherein the support is a carbon-containing particle.

Embodiment 10

The liquid filtration device of any one of embodiments 8-9, wherein the sulfur source is selected from elemental sulfur, hydrogen sulfide, sulfided carbon, and combinations thereof.

Embodiment 11

The liquid filtration device of any one of embodiments 8-10, wherein the metal salt is selected from a carboxylate, a nitrate, a halide, a sulfate, a hydroxide, a carbonate, and combinations thereof.

Embodiment 12

The liquid filtration device of any one of embodiments 8-11, wherein the metal carbonyl is a metal carbonyl comprising a metal and carbon monoxide.

Embodiment 13

The liquid filtration device of any one of embodiments 8-12, wherein the thiometallate and oxythiometallate are at least one of: a salt of $MS_4^{-2}$, $MO_2S_2^{2-}$, and $MOS_3^{2-}$ and wherein the metal, M, is molybdenum or tungsten.

Embodiment 14

The liquid filtration device of any one of embodiments 8-13, wherein the supported metal sulfide is disposed in a web, a polymer-containing composite block, on the surface of a tube, or in another structure that enables aqueous solutions to pass therethrough.

Embodiment 15

A method for removing chloramine from aqueous solutions comprising: providing an aqueous solution comprising chloramine and contacting the aqueous solution with a composition comprising at least 0.5% by weight of a metal sulfide.

Embodiment 16

The method of embodiment 15, wherein the composition comprises a support, wherein the surface of the support comprises the metal sulfide.

Embodiment 17

The method of embodiment 16, wherein the support is a carbon-containing particle.

Embodiment 18

The method of any one of embodiments 15-17, wherein the metal of the metal sulfide is selected from copper, iron,

Embodiment 19

The method of any one of embodiments 15-18, wherein the metal sulfide is disposed in a matrix.

Embodiment 20

The method of any one of embodiments 15-19, wherein the matrix is a web, or a polymer-containing composite block.

Embodiment 21

A material for removal of chloramine comprising carbon, molybdenum, and sulfur.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: g=gram, hr=hour, in=inch, kg=kilograms, min=minutes, mol=mole; M=molar, cm=centimeter, mm=millimeter, ml=milliliter, L=liter, N=normal, psi=pressure per square inch, MPa=megaPascals, and wt=weight.

Testing Methods

Apparent Density Determination

The apparent density of a sample (prepared according to Comparative Examples or the Examples according to the disclosure) was determined by tapping a weighed sample in a graduated cylinder until closest packing was achieved. The closest packing was deemed to occur when tapping did not produce a further decrease in volume of the carbon substrate sample.

Chloramine Test

The chloramine content of water samples was determined from the total chlorine content in the samples. Total chlorine (OCl⁻ and chloramines) concentration was measured by the DPD Total Chlorine Method, Hach Method 8167, which Hach Company claims to be equivalent to USEPA Method 330.5. The free chlorine (OCl–) concentration was periodically measured by the DPD Free Chloramine Analysis, Hach Method 8021, which Hach company claims is equivalent to EPA Method 330.5. Free chlorine was maintained at a negligible concentration (<0.2 ppm), thus, the total chlorine analysis was considered a good approximation of the concentration of chloramines in the water. All reagents and the instruments were those described in the standard Hach Method and can be obtained from Hach Company, Loveland, Colo.

Chloramine Preparation 3 ppm chloramine was prepared by adding the appropriate amount of commercial bleach (5.25% NaOCl) to deionized water. While stirring, 1.5 equivalents of a solution of ammonium chloride in water was added to the bleach solution and stirred for 1 hour. The pH was adjusted to 7.6 by the addition of NaOH or HCl and tested using a pH meter (obtained from Thermo Fisher Scientific, Inc., Waltham, Mass., under the trade designation "ORION 3-STAR").

Chloramine Removal Test

An aqueous chloramine test solution was prepared comprising 3 ppm $NH_2Cl$ (prepared as described above) at a pH 7.6 at 27° C. Immediately prior to the test, the initial total chlorine content of the aqueous chloramine test solution was measured as described in the Chloramine Test above. With continuous stirring, a 0.46 g aliquot of a carbon substrate sample (i.e. a sample prepared according to Comparative Examples or the Examples according to the disclosure) was added to the aqueous chloramine test solution. For the commercially available metal or metal oxides shown in Table 1, the samples were compared on a per volume basis, measuring 1.5 cc. Immediately after mixing, a timer was started. After 30 sec, a 5 mL-aliquot of mixture was removed and within 5 sec of removal, the mixture was passed through a 1-micrometer syringe filter to remove suspended solids. The chloramine content of the filtered aliquot was measured within 30 sec of taking the 5-mL aliquot as described above. Aliquots from the mixture were taken periodically over the course of 5 minutes and analyzed using the Chloramine Test as described above. The efficiency of the chloramine removal is reported as the % chloramine reduction determined by the equation:

$$\left(1 - \frac{[NH2Cl] filtered aliquot}{[NH2Cl] initial}\right) \times 100$$

Method for Sulfur Analysis

Sulfur analyses were run on a LECO 932 CHNS Elemental Analyzer (obtained from LECO Corporation, St. Joseph, Mich.).

Method for Metal Analysis

Metal analyses were non-trivial because the samples can be difficult to dissolve. To char the samples, approximately 50 mg aliquot were strongly heated with 3 mL concentrated sulfuric acid in acid-washed quartz beakers. Decomposition of organic material was completed by dropwise addition, while hot, of 2 mL concentrated nitric acid. The cooled solutions were quantitatively transferred to polypropylene containers and diluted to 25 mL; further dilution may be necessary depending on the metal content. Samples were then analyzed against external calibration curves using a Perkin Elmer Optima ICP Optical Emission Spectrometer (Perkin Elmer Inc., Waltham, Mass.).

Substrates

Substrate A was an activated carbon powder with an ash content of 2.9 wt % (obtained under the trade designation "RGC Powder" (−325 mesh) from MeadWestvaco Specialty Chemicals, North Charleston, S.C.) used as received without further treatment.

Substrate B was a granular activated carbon, 80×325 mesh, with an ash content of 2.9 wt % (obtained under the trade designation "RGC 325" from MeadWestvaco Specialty Chemicals, North Charleston, S.C.) used as received without further treatment.

Example 1

Carbon Substrate A, 50 g, was added to a solution of 10.5 g $Na_2S.9H_2O$ in 1 L deionized water. A solution of 12.2 g $FeSO_4.7H_2O$ in 150 mL water was added drop wise with brisk mechanical stirring. The solid product was isolated by filtration and washed with four 500 mL portions of water then dried for 16 hr at 130 C. It weighed 53 g.

Example 2

For Example 2A, potassium permanganate (KMnO$_4$), 8.6 g was dissolved with stirring in 125 mL deionized water and filtered through a glass wool plug. It was added drop wise with brisk mechanical stirring to a slurry of 60 g Carbon Substrate A in 1 L deionized water. A 3° C. exotherm occurred. After the addition, the solid product was separated from the colorless liquid phase by filtration and dried at 130° C. for 4 hr. The weight was 62.5 g, Anal. 4.5% Mn.

For Example 2B, a similar reaction was carried out with 60 g of Carbon Substrate B. The product weighed 60 g and contained 3.0% Mn.

For Example 2C, a similar reaction was carried out using 60 g of Carbon Substrate B on and 17.2 g KMnO$_4$. The product weighed 71.5 g and contained 7.2% Mn. The increased weight is considered to be due to a larger amount of water being adsorbed by the more extensively oxidized (and therefore more hydrophobic) carbon. 10 g of manganese oxide on carbon sample from Example 2A above and 0.84 g sulfur were mixed well, The sample was then heated in a reactor consisting of a 15×1.5 inch (381×38.1 mm) glass tube connected via a 20 mm Solv-Seal joint (Andrews Glass Co., Vineland, N.J.) to a 10 mm greaseless high vacuum stopcock and vacuum line interface. A plug of glass wool was inserted ahead of the stopcock to prevent loss of entrained solids. After outgassing for 30 min, the reactor was backfilled to atmospheric pressure with nitrogen and the reactor and contents were heated in a vertical furnace at 200° C. for 1 hr under N$_2$. The sample was then cooled to room temperature. After cooling to room temperature, the reactor was evacuated via a liquid nitrogen cooled trap for 15 min then opened to isolate the product. The product weighted 10.0 g.

Example 3

A solution of 5 g Co(NO$_3$)$_2$.6H$_2$O in 150 mL deionized water was mixed with 50 g Carbon Substrate A. The resulting paste was dried for 16 hr at 130° C.

This cobalt-impregnated carbon, 10 g, and 1 g sulfur were mixed well then transferred to the glass tubular reactor and heated at 400° C. for 1 hr as described above in Example 2. Workup consisted of removing volatile products as described above. The product weighed 10.5 g.

Example 4

Mn$_2$(CO)$_{10}$ (Strem Chemicals Inc., Newburyport Mass.), sublimed under vacuum to remove small amounts of nonvolatile impurities, was ground to a fine powder. The metal carbonyl, 1.78 g, and 10 g Carbon Substrate A were thoroughly mixed, transferred to the glass tubular reactor, outgassed for 30 min, and heated at 400° C. for 1 hr as described above in Example 2. The product weighed 10.3 g.

Example 5

Sulfided carbon was prepared by heating an intimate mixture of 39 g Carbon Substrate A and 3.9 g powdered sulfur in a reactor consisting of a 15×1.5 inch (381 mm×38.1 mm) glass tube connected via a 20 mm Solv-Seal joint (Andrews Glass Co., Vineland, N.J.) to a 10 mm greaseless high vacuum stopcock and vacuum line interface. A plug of glass wool was inserted ahead of the stopcock to prevent loss of entrained solids and the reactor and contents were heated in a vertical furnace at 400° C. for 1 hr. The sample was then cooled to room temperature. Air was not removed from the reactor prior to heating.

The sulfided Carbon Substrate A prepared above, 10 g, and 40 mL 1M silver nitrate in water were stirred for 1 hr. The solid phase was isolated by filtration, washed with deionized water and air dried. The yield was 16.1 g. This silver-treated carbon was placed in a small crystallizing dish that was in turn placed in a larger jar. Hydrazine hydrate, 2 mL, was introduced into the jar which was then sealed. In this way, the treated carbon was exposed only to hydrazine vapor and not liquid. After 4 hr, the product was removed, allowed to stand in air for 24 hr, and then dried for 15 min on a vacuum line. It weighed 14.1 g.

Example 6

A solution of 3.0 g ammonium tetrathiomolybdate (Sigma-Aldrich, Milwaukee Wis.) was dissolved with stirring in 80 mL warm deionized water. The solution was filtered through a glass wool plug and added to 25 g Substrate A. Additional water, 40 mL, was added to promote stirring. The resulting mixture was dried for 16 hr at 130° C. The carbon supported (NH$_4$)$_2$MoS$_4$, 8 g, was placed in then transferred to the glass tubular reactor, outgassed for 1 hr, and heated at 300° C. for 1 hr under nitrogen as described above in Example 2. Any volatile products were removed under vacuum as described above. The product remaining weighed 7.0 g.

Samples for Examples 1, 3, 4 and 5 were tested for chloramine removal by using the Chloramine Removal Test described above. Table 1 below summarizes the % chloramine removed after 300 seconds of testing by each of above samples.

TABLE 1

| Example | % Chloramine removed |
| --- | --- |
| 1 | 75 |
| 3 | 58 |
| 4 | 75 |
| 5 | 74 |

Foreseeable modifications and alterations of this invention will be apparent to those skilled in the art without departing from the scope and spirit of this invention. This invention should not be restricted to the embodiments that are set forth in this application for illustrative purposes. To the extent that there is a conflict or discrepancy between this specification and the disclosure in any document incorporated by reference herein, this specification will control.

What is claimed is:

1. A method for removing chloramine from aqueous solutions, the method comprising:
providing an aqueous solution comprising chloramine; and
contacting the aqueous solution with a supported metal sulfide composition, wherein the supported metal sulfide composition comprises spherically-shaped carbon-containing particles and the surface of the spherically-shaped carbon-containing particles comprises at least 0.5% by weight of a metal sulfide.

2. The method of claim 1, wherein the metal of the metal sulfide is selected from copper, iron, manganese, silver, zirconium, niobium, molybdenum, tungsten, and combinations thereof.

3. The method of claim 1, wherein the supported metal sulfide composition is disposed in a matrix.

4. The method of claim 3, wherein the matrix is a web, or a polymer-containing composite block.

5. The method of claim 1, wherein the spherically-shaped carbon-containing particles are activated carbon.

6. The method of claim 1, wherein the supported metal sulfide composition comprises carbon, molybdenum, and sulfur.

7. The method of claim 1, wherein the supported metal sulfide composition is selected from a reaction product of:
(a) co-precipitation of the metal sulfide onto spherically-shaped carbon-containing particles;
(b) reacting spherically-shaped carbon-containing particles comprising a metal oxide with a sulfur source;
(c) reacting spherically-shaped carbon-containing particles comprising a metal salt with a sulfur source;
(d) heating spherically-shaped carbon-containing particle with a metal carbonyl in the presence of a sulfur source;
(e) reacting spherically-shaped carbon-containing particles comprising a metal with a sulfur source; and
(g) thermal decomposition of spherically-shaped carbon-containing particles comprising a thiometallate or oxy-thiometallate.

8. The method of claim 7, wherein the sulfur source is selected from elemental sulfur, hydrogen sulfide, sulfided carbon, and combinations thereof.

9. The method of claim 7, wherein the metal salt is selected from a carboxylate, a nitrate, a halide, a sulfate, a hydroxide, a carbonate, and combinations thereof.

* * * * *